Nov. 1, 1966    J. MAKSIM, JR    3,281,943
TAPE MEASURE
Filed Nov. 13, 1964    3 Sheets-Sheet 1
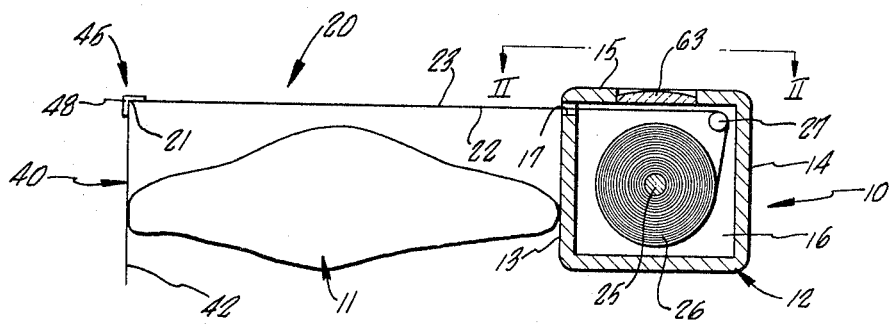
FIG_1_
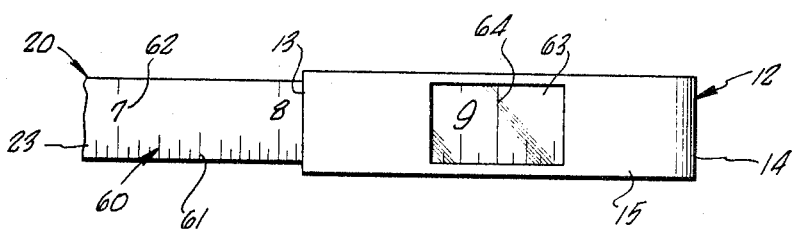
FIG_2_
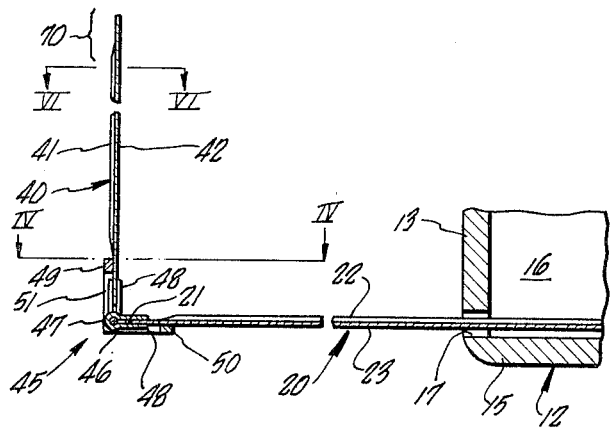
FIG_3_
INVENTOR.
JOHN MAKSIM, JR
BY
Christie, Parker & Hale
ATTORNEYS.

Nov. 1, 1966  J. MAKSIM, JR  3,281,943
TAPE MEASURE

Filed Nov. 13, 1964  3 Sheets-Sheet 2

INVENTOR.
JOHN MAKSIM, JR.
BY
Christie, Parker & Hale
ATTORNEYS.

Nov. 1, 1966  J. MAKSIM, JR  3,281,943
TAPE MEASURE

Filed Nov. 13, 1964  3 Sheets-Sheet 3

INVENTOR.
JOHN MAKSIM, JR.
BY
Christie, Parker & Hale
ATTORNEYS.

United States Patent Office 3,281,943
Patented Nov. 1, 1966

3,281,943
TAPE MEASURE
John Maksim, Jr., 8165 Cornwall Ave.,
Etiwanda, Calif.
Filed Nov. 13, 1964, Ser. No. 412,286
14 Claims. (Cl. 33—138)

This application is a continuation-in-part of application Serial Number 378,239, filed June 26, 1964, now abandoned.

This invention relates to apparatus for measuring a linear dimension and, more particularly, to a steel tape measure adapted for measuring an irregularly shaped object.

Conventional tape measures are useful usually only in situations where the dimension to be measured is along a substantially flat surface. This invention, however, provides a steel tape measuring device which is useful for measuring a linear dimension of an irregularly shaped object. The device is also adapted for use in measuring the internal dimension of a container, for example. Conventional tape measures generally provide only a single scale on the tape. The improved tape measure, however, includes at least one scale on each side of the tape so there is always a scale visible for observation.

Generally speaking, the invention resides in a tape measure which includes a housing defining an enclosed chamber therein. The housing has a straight exterior side and a slot aperture from the chamber to the exterior of the housing. A strip of inelastic material is retractably coiled in the housing and has an end outside the housing. A scale is carried by the strip and extends from the said end of the strip along the strip. The scale is graduated in selected units of measure. The invention includes a straight post member disposed adjacent to and parallel to the straight side of the housing. Means are provided for mounting the post member for movement toward and away from the housing. The apparatus also includes means cooperating between the housing and the post member and defining a scale for indicating the distance between the post member and the straight edge of the housing.

In one embodiment of the invention, the post member is hingably mounted to one end of the strip for movement into and out of alignment with the strip. The hinge means includes stop means for limiting movement of the post member out of alignment with the strip to a position in which the post member is normal to the strip. The stop means, in cooperation with the housing adjacent the slot aperture, also provides means for preventing movement of the one end of the strip into the housing when the post member is aligned with the strip. The strip and the post member are fabricated of substantially inelastic yet laterally resiliently deformable elements of substantially equal width.

In a second embodiment of the invention, the post member is mounted to the housing by means independent of the strip. The scale for indicating the distance between the post member and the straight side of the housing is carried by the housing.

The above-mentioned and other features of the invention are more fully set forth in the following detailed description of the invention taken in conjunction with the accompanying drawings wherein:

FIG. 1 is a cross-sectional elevation view of a tape measuring device according to this invention showing how the device is used for measuring a linear dimension of an irregularly shaped object;

FIG. 2 is an enlarged plan view taken along line II—II of FIG. 1;

FIG. 3 is an enlarged fragmentary cross-sectional elevation view of the outer end of the strip showing the post member and the hinge means;

Figure 4:
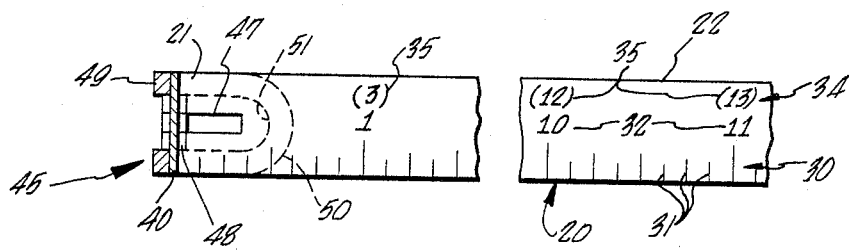
FIG. 4 is an enlarged cross-sectional plan view taken along line IV—IV of FIG. 3.

FIG. 1 shows a tape measuring device 10 according to this invention as the device is used for measuring an irregular object 11. The measuring device includes a housing 12 having first and second preferably straight and parallel sides 13 and 14. The housing also has a third side 15 which is substantially straight and which preferably is disposed normal to the first and second sides of the housing. The housing is hollow and defines an interior chamber 16. A slot aperture 17 is formed through the first side of the housing adjacent the intersection of the first side with third side 15.

An elongated strip 20 of steel tape is passed through slot aperture 17 so that it has one end 21 disposed exteriorly of the housing. The other end of the tape strip is disposed inside the housing. Since strip 20 is fabricated of steel, it is inelastic along its elongate extent, yet it is resiliently flexible in the direction of its thickness. The tape has a first side 22 disposed toward the end of the housing first side remote from the slot aperture, and a second side 23 disposed toward the third side of the housing.

Means in the housing are operably engaged with tape strip 20 for coiling the strip on itself in the housing when end 21 of the strip moves toward the housing. A rotatable shaft 25 extends transversely of the central portion of housing of chamber 16 parallel to slot aperture 17. The inner end of the tape strip is connected to shaft 25. The shaft is resiliently biased for rotation by means (not shown) in the form of a torsion spring, for example, so that the strip is wound about the shaft to form a coil 26 of tape in the housing. A guide roller 27 is rotatably mounted in the housing parallel to shaft 25 adjacent the intersection of the housing second and third sides. Strip 20 is passed from coil 26 around roller 27 and through slot aperture 17. Shaft 25 is biased for rotation in a direction which draws strip outer end 21 toward the housing. The outer end of the strip, however, is prevented from passing through slot aperture 17 by apparatus described below.

First side 22 of the tape strip carries a measuring scale 30 (see FIG. 4) having its origin at end 21 of the tape strip and which is calibrated to indicate selected units of measurement, preferably inches. Scale 30 is comprised of a series of regularly spaced reference marks 31 which denote the selected units and fractions thereof. The scale also includes a series of numerical indicia 32 which denote serial values of those of reference marks 31 which indicate integral units of measurement. The series of numerical indicia commences with the value zero, although an indicium denoting zero perferably is not imprinted on the tape.

Preferably, the surfaces of housing sides 13 and 14 are spaced apart a distance $n$ measuring units in length, $n$ being an integer. In the device shown in the drawings $n$ equals 2. So that tape measure 10 may be used for measuring the internal dimension of a box, for example, the first side of the tape strip carries a second scale 34 which reference marks denoting units of measurement and fractions thereof common to scale 30. Scale 34 also includes a series of numerical indicia 35 denoting serial values of those of reference marks 31 which indicate integral units of measurement. Scale 30 has its origin at end 21 of the tape strip. In the case of scale 34, however, the series of indicia 35 commences with the value n, although this value preferably is not indicated on the strip. Scale 34 is distinguished from scale 30 by providing indicia 35 in a form which is visibly different from indica 32. As shown in FIG. 4, indicia 35 are disposed in brackets or parentheses; alternatively, it may be desirable for indicia 35 to be printed on the strip in a different color than indicia 32.

Figure 5:
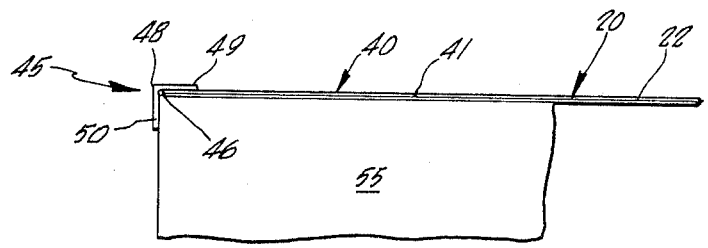
FIG. 5 is an elevation view showing how the device shown in FIG. 1 is used as a conventional tape measure.

When tape measure 10 is used in the conventional manner to measure a plank 55, as shown in FIG. 5, end 21 of the tape strip is disposed at the beginning point of the length to be measured. The measured length is determined by reference to scale 30. When a linear dimension across the inner bottom of a box, for example, is to be measured, strip end 21 is disposed against one wall of the box and housing second side 14 is disposed adjacent the opposite wall of the box. The measurement is obtained by observing the point on scale 34 which lies at the opening of slot aperture 17. The proper measurement is presented on scale 34 since the numerical indicia of the scale are displaced along the strip toward strip end 21 a distance equal to the width of housing 12, i.e., the distance between housing surfaces 13 and 14.

Figure 6:
FIG. 6 is an enlarged cross-sectional view of the post member taken along line VI—VI of FIG. 3.

In order that tape measure 10 may be used for measuring an irregularly shaped project, as shown in FIG. 1, a post member 40 is hingably connected to end 21 of the tape strip. The post member is elongated and normally is straight, and yet it is laterally resiliently deformable in a direction transversely of its elongate extent. Preferably post member 40 is fabricated from a length of steel tape such as that used for tape strip 20 so that the width of the post member does not exceed the width of strip 20. As indicated in FIG. 6, the post member preferably is curved sufficiently transversely of its elongate extent to render the post member resistant to bending in the direction of its thickness. The curvature of the post member, however, is not sufficient to prevent the post member from being bent transversely of its elongate extent. The curvature of the post member is such that it has a concave first side 41 and a convex second side 42. It is also preferred that tape strip 20 be curved transversely of its elongate extent into the configuration shown in FIG. 6 so that the first side of the strip is concave.

Hinge means 45 are provided at the outer end of the tape strip for connecting the outer end of the tape strip to one end of the post member. A hinge pin 46 is disposed transversely of the elongate extent of the tape strip immediately adjacent to the end of the strip. The pin lies substantially in the plane of the strip. Similarly, hinge pin 46 is disposed substantially in the plane of the post member transversely of the length of the post member. A U-shaped clip 47 is secured to strip end 21 and journals the central portion of hinge pin 46. The end of the strip is engaged between the parallel legs of the clip. Similarly, a pair of U-shaped clips 48 are secured to the lower end of post member 40 and journal the opposite ends of the hinge pin.

The hinge means includes a stop member 48 (see FIGS. 1 and 5) bent at right angles centrally of its length. One leg 49 of the stop member is secured to the first side of the post member adjacent the hinge pin. The second leg 50 of the stop member extends past the second side of the post member to beyond the hinge pin, as shown in FIGS. 3 and 5. The central portion of the stop member in the vicinity of the right angle bend thereof is cut away, as shown at 51 in FIGS. 3 and 4, to provide clearance for hinge clip 47 in either of the two limiting positions of the post member relative to the tape strip.

Stop member 48 has two distinct functions. As shown in FIG. 3, leg 50 of the stop member is engaged with second side 23 of the tape strip when the post member is hinged away from parallel alignment with the tape strip. This engagement of the stop member with the strip limits movement of the post member to a position in which the post member is disposed normal to the elongate extent of the tape strip. On the other hand, when the post member is hinged into parallel alignment with the tape strip, as shown in FIG. 5, stop member leg 50 is disposed at right angles to the tape strip. Leg 50 thereby functions as the hook which normally is provided at the outer end of the steel tape in a conventional tape measure. When leg 50 is in the position illustrated in FIG. 5, it also serves to prevent the tape from passing completely into the housing.

Because the post member is laterally resiliently deformable, it may be reeled with the tape strip into coil 26 when the post member is in parallel alignment with the strip. It is thus apparent that post member 40 is retractible into housing 12. Accordingly, tape measure has the appearance of a conventional tape measure when it is not in use.

To the extent that post member 40 overlies the scales carried by side 22 of the tape strip, as when the strip is used to measure a length along plank 55, first side 41 of the post member may carry a reproduction of those portions of scales 30 and 34 which are covered by the post member.

When the tape measure 10 is used to measure an irregular object, post member 40 is disposed normal to the tape strip as shown in FIG. 1. Second side 42 of the post member is then engaged with one side of the object. The other side of the object is engaged by the surface of housing side 13. The post member and the surface of the housing are oriented parallel to one another. The distance between the post member and the adjacent surface of the housing then may be observed on scale 30 to determine the distance measured.

In many instances, however, the object measured is such that scale 30 is not readily observable. Accordingly, a scale 60 is provided along side 23 of the tape strip. The scale is comprised of a series of reference marks 61 which indicate selected units of measure and fractions thereof. Reference marks 61 are spaced closer together than reference marks 31 to indicate smaller fractions of inches than are indicated by scales 30 and 34. Scale 60 also includes a series of numerical indicia 62 which denote predetermined values of those indicia 61 which denote units.

A magnifying lens 63 is disposed in housing side 15 to provide a window through the housing to side 23 of the tape. The tape is disposed adjacent the lens by the arrangement of roller 27 in the housing and the path which the tape follows over the roller to coil 26. Lens 63 carries a hairline reference mark 64 which is disposed parallel to and is spaced a predetermined distance from the exterior surface of housing side 13. Scale 60 has its origin or zero indicating reference mark located the same predetermined distance from end 21 of tape strip 20. The displacement of scale 60 along the tape strip automatically compensates for the displacement of hairline 64 from the outer surface of housing side 13. Accordingly, the reading indicated by the cooperation of the hairline reference mark with scale 60 is the distance between the opposing surfaces of the post member and the housing.

In order that the post member be maintained in parallel alignment with the tape strip as when the device is used as a conventional tape measure, a portion 70 of the post member adjacent the unhinged end thereof is permanently magnetized. Accordingly, it is preferred that the steel from which tape strip 20 is fabricated be a ferromagnetic steel. Magnet 70 then provides a selectively disengageable mechanism for maintaining the post member in parallel alignment with the tape strip.

Figure 7:
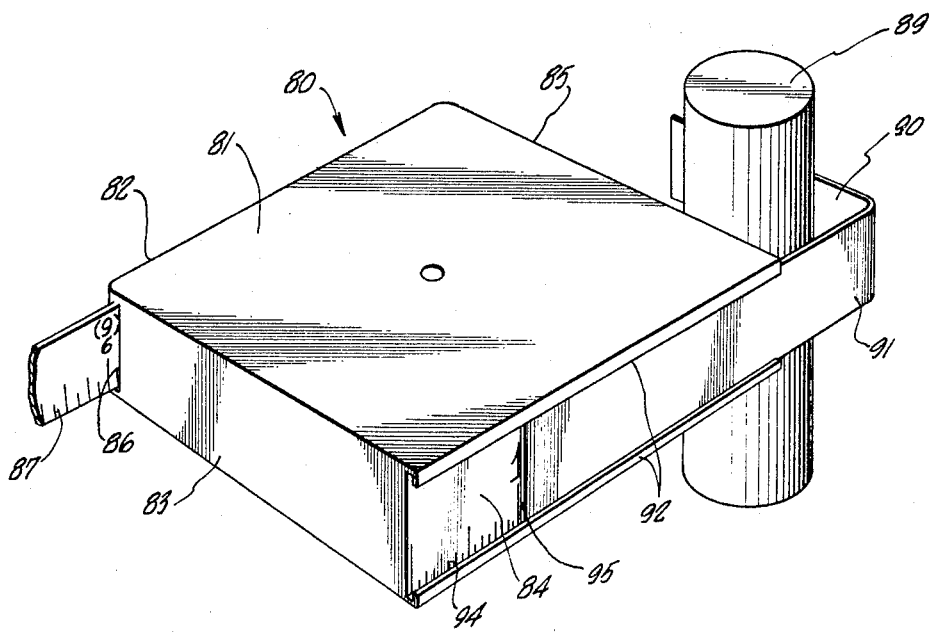
FIG. 7 is a perspective view of a second embodiment of the invention.

FIGURE 7 shows a tape measure 80 which includes a hollow substantially rectangular housing 81 having four straight sides 82, 83, 84, and 85. The sides are arranged to intersect one another at right angles. A slot aperture 86 is formed through side 83 into the interior of the housing adjacent the intersection of sides 82 and 83. The aperture preferably is aligned parallel to the transverse extent of side 82. An elongated strip 87 of steel tape is passed through the slot aperture from the interior of the housing to an end (not shown) outside the housing.

Tape measure 80 includes apparatus for measuring the transverse dimensions of small objects, particularly objects of non-square cross-sectional configuration such as a dowell 89 and the like. This apparatus includes a straight, elongated, substantially rigid post member 90 disposed adjacent to and parallel to one of the straight sides of the housing. FIG. 7 shows post member 90 disposed adjacent side 85, but those skilled in the art will realize that the post member may be disposed adjacent any of the other sides of the housing without departing from the scope of this invention. Huosing side 85 is the side of the housing parallel to the side through which tape 87 extends. A lateral extension 91 is formed integral with the post member and extends normally therefrom. A pair of flanged parallel guides 92 are defined by the housing along side 84. Extension 91 is slidably engaged within and between the guides. Post member 90 is thus mounted for movement toward and away from housing side 85. The connection of the post member to the housing assures that the post member is maintained parallel to the housing side during such movement. A scale 94 is carried by housing side 84 between the guides. The scale has its origin at the end of side 84 opposite from the post member. The extension has an end 95 opposite from the post member which cooperates with the scale to indicate the distance between the opposing surfaces of the post member and the housing. Those skilled in the art, however, will recognize that the scale may be carried by the side of extension 91 which opens away from the housing and that the indication of the distance of the post member from the housing may be provided by a reference mark secured to one of the guides in cooperation with the scale.

Workers skilled in the art will appreciate that post member 90 and its mounting means may be incorporated into a tape measure in accord with the structure described above with respect to FIGS. 1–6; these additional embodiments of the invention have not been illustrated in detail, however, in order that the foregoing description, and the illustrations accompanying it, may be simplified.

While the invention has been described above in conjunction with specific apparatus constituting preferred embodiments of the invention, this has been by way of example only and is not to be considered as limiting the scope of this invention.

What is claimed is:

1. Apparatus for measuring a linear dimension comprising a housing defining an enclosed chamber therein and having a straight exterior side and a slot aperture from the chamber to the side at one end thereof, an elongated strip substantially inelastic in the direction of its elongate extent and resiliently flexible in the direction of its thickness, the strip passing through the slot aperture so that one end of the strip is disposed in the chamber and the other end is disposed exteriorly of the housing, one side of the strip carrying a scale calibrated in selected units of measurement, the scale having its origin at the other end of the strip, reeling means in the housing coupled to the one end of the strip operable to coil the strip on itself when the other end of the strip moves toward the housing, an elongated normally straight post member similar to said strip having resilient flexibility in the direction of its thickness for coiling in the housing with the strip when the post member is aligned and engaged with the strip and the strip is substantially fully coiled in the housing and having sufficient length that it is coiled with the strip in the housing when the strip is substantially fully coiled in the housing, and hinge means hingably connecting one end of the post member to the other end of the strip for movement of the post member into and out of parallel alignment and overlying engagement with the strip, the hinge means including means for limiting movement of the post member out of alignment with the strip to a position in which the post member is normal to the thickness of the strip.

2. Apparatus for measuring a linear dimension comprising a housing defining an enclosed chamber therein and having a straight exterior side and a slot aperture from the chamber to the side at one end thereof, an elongated strip substantially inelastic in the direction of its elongate extent and resiliently flexible in the direction of its thickness, the strip passing through the slot aperture so that one end of the strip is disposed in the chamber and the order end is disposed exteriorly of the housing, one side of the strip carrying a scale calibrated in selected units of measurement, the scale having its origin at the other end of the strip, reeling means in the housing coupled to the one end of the strip operable to coil the strip on itself when the other end of the strip moves toward the housing, an elongated normally straight yet laterally resilient post member, and hinge means hingably connecting one end of the post member to the other end of the strip for movement of the post member into and out of parallel alignment and engagement with the strip, the hinge means including means for limiting movement of the post member out of alignment with the strip to a position in which the post member is normal to the strip, the last-named means being disposed normal to the strip and extending away from the other side of the strip when the post member is aligned with the strip, for engaging the housing adjacent the aperture to maintain the said other end of the strip exteriorly of the housing when the strip and the post are passed into the housing.

3. Apparatus according to claim 2 wherein the strip is fabricated or ferromagnetic material and the other end of the post member is magnetized to hold the post member normally in engagement with the strip.

4. Apparatus for measuring a linear dimension comprising a housing having a first straight side and a second substantially straight side intersecting the first side and lying normal thereto and defining an enclosed chamber therein and a slot aperture from the chamber to the first side adjacent the second side, an elongated strip substantially inelastic in the direction of its elongate extent and resiliently flexible in the direction of its thickness, the strip passing through the slot aperture so that one end of the strip is disposed in the chamber and the other end is disposed exteriorly of the housing, one side of the strip carrying a scale calibrated in selected units of measurement, the scale having its origin at the other end of the strip, reeling means in the housing coupled to the one end of the strip operable to coil the strip on itself when the other end of the strip moves toward the housing, an elongated normally straight yet laterally resilient post member, and hinge means hingably connecting one end of the post member to the other end of the strip for movement of the post member into and out of parallel alignment and engagement with the strip, the hinge means including means for limiting movement of the post member out of alignment with the strip to a position in which the post member is normal to the strip, the last-named means being disposed normal to the strip when the post member is aligned with the strip and extending away from the side of the strip which opens toward the second side of the housing, a distance greater than the distance of the slot aperture from the second side of the housing.

5. Apparatus for measuring a linear dimension comprising a housing having a first straight side and a second substantially straight side intersecting the first side and lying normal thereto and defining an enclosed chamber therein and a slot aperture from the chamber to the first side adjacent the second side, an elongated strip substantially inelastic in the direction of its elongate extent and resiliently flexible in the direction of its thickness, the strip passing through the slot aperture so that one end of the strip is disposed in the chamber and the other end is disposed exteriorly of the housing, one side of the strip carrying a scale calibrated in selected units of measurement, the scale having its origins at the other end of the strip, reeling means in the housing coupled to the one end of the strip operable to coil the strip on itself when the other end of the strip moves toward the housing, an elongated substantially planar post member having a width no greater than the width of the strip, the post member normally being straight but being resiliently flexible like the strip, and hinge means hingably connecting one end of the post member to the other end of the strip for movement of the post member into and out of parallel alignment and engagement with the side of the strip opposite from the second side of the housing, the hinge means including means for limiting movement of the post member out of alignment with the strip to a position in which the post member is normal to the strip, the last-named means being disposed normal to the strip and extending away from the other side of the strip when the post member is aligned with the strip a distance greater than the spacing of the slot aperture from the housing second side to prevent the said other end of the strip from entering the housing.

6. Apparatus for measuring a linear dimension comprising a housing having a first straight side and a second substantially straight side intersecting the first side and lying normal thereto and defining an enclosed chamber therein and a slot aperture from the chamber to the first side adjacent the second side, an elongated strip substantially inelastic in the direction of its elongate extent and resiliently flexible in the direction of its thickness, the strip passing through the slot aperture so that one end of the strip is disposed in the chamber and the other end is disposed exteriorly of the housing, the side of the strip opening away from the housing second side carrying a first scale calibrated in selected units of measurement and having its origin at the said other end of the strip, the other side of the strip carrying a second scale calibrated in the selected units of measurement and having its origin spaced a predetermined distance from the said other end of the strip, reeling means in the housing coupled to the one end of the strip operable to coil the strip on itself when the other end of the strip moves toward the housing, a window formed in the second side of the housing to expose the said other side of the strip and defining a reference line for the second scale, the reference line being spaced a distance equal to the predetermined distance from the housing first side, an elongated substantially planar post member having a width no greater than the width of the strip, the post member normally being straight but being resiliently flexible like the strip, and hinge means hingably connecting one end of the post member to the other end of the strip for movement of the post member into and out of parallel alignment with the side of the strip carrying the first scale, the hinge means including means for limiting movement of the post member out of alignment with the strip to a position in which the post member is normal to the strip, the last-named means being disposed normal to the strip and extending away from said other side of the strip when the post member is aligned with the strip to engage the housing adjacent the slot aperture to prevent the other end of the strip from passing through the slot aperture when the strip is reeled.

7. Apparatus according to claim 6 wherein the strip is fabricated of a ferromagnetic material, and the other end of the post member is magnetized to hold the post member normally in engagement with the strip.

8. Apparatus according to claim 6 including a magnifying lens mounted in said window and defining the reference line.

9. Apparatus according to claim 6 wherein the means for limiting movement of the post member extends away from the other side of the strip a distance greater than the distance from the slot aperture to the housing second side when the post member is engaged and aligned with the strip.

10. Apparatus for measuring a linear dimension comprising a housing defining an enclosed chamber therein and having first and second opposite parallel and straight spaced sides, a third side interconnecting the first and second sides, and a slot aperture from the chamber to the first side adjacent the third side, an elongated strip substantially inelastic in the direction of its elongate extent and resiliently flexible in the direction of its thickness, the strip passing through the slot aperture so that one end of the strip is disposed in the chamber and the other end is disposed exteriorly of the housing, the strip being adapted to be coiled on itself in the housing when the other end thereof is moved toward the housing, the side of the strip opening toward the end of the housing first side away from the housing third side carrying a first scale calibrated in selected units of measurement and having its origin at the said other end of the strip, the first and second sides of the housing being spaced apart $n$ integral selected units of measurement, one side of the strip carrying a second scale calibrated in the selected units of measurement and having its origin at the said other end of the strip commencing with the value $n$, an elongated substantially planar post member having a width no greater than the width of the strip, the post member normally being straight but being resiliently flexible like the strip, hinge means hingably connecting one end of the post member to the other end of the strip for movement of the post member into and out of parallel alignment and engagement with the side of the strip opposite from the third side of the housing, the hinge means including stop means for limiting movement of the post member out of alignment with the strip to a position in which the post member is normal to the strip, the side of the post member which is opposite from the strip when the post member is aligned with the strip reproducing the portions of the first and second scales which are overlaid by the post member when the post member is aligned and engaged with the strip.

11. Apparatus for measuring a linear dimension comprising a housing having first and second opposite parallel and straight spaced sides and a third substantially straight side intersecting the first and second sides and lying normal thereto and defining an enclosed chamber therein and a slot aperture from the chamber to the first side adjacent the third side, an elongated strip substantially inelastic in the direction of its elongate extent and resiliently flexible in the direction of its thickness, the strip passing through the slot aperture so that one end of the strip is disposed in the chamber and the other end is disposed exteriorly of the housing, the strip being adapted to be coiled on itself in the housing when the other end thereof is moved toward the housing, the side of the strip opening away from the housing third side carrying a first scale calibrated in selected units of measurement and having its origin at the said other end of the strip, the first and second sides of the housing being spaced apart $n$ integral selected units of measurement, one side of the strip carrying a second scale calibrated in the selected units of measurement and having its origin at the said other end of the strip commencing with the value $n$, the other side of the strip carrying a third scale calibrated in the selected units of measurement and having its origin spaced a predetermined distance from the said other end of the strip, a window formed in the third side of the housing to expose the said other side of the strip, means in the housing for guiding the strip past the window, a magnifying lens mounted in the window and defining a third scale reference mark disposed parallel to and said predetermined distance from the housing first side, an elongated substantially planar post member having a width no greater than the width of the strip, the post member normally being straight but being resiliently flexible like the strip, hinge means hingably connecting one end of the post member to the other end of the strip for movement of the post member into and out of parallel alignment and engagement with the side of the strip opposite from the third side of the housing, the hinge means including stop means for limiting movement of the post member out of alignment with the strip to a position in which the post member is normal to the strip, the last-named means being disposed normal to the strip when the post member is aligned with the strip and extending away from said other side of the strip a distance greater than the spacing of the slot aperture from the housing third side, the side of the post member which is opposite from the strip when the post member is aligned with the strip reproducing the portions of the first and second scales which are overlaid by the post member when the post member is aligned and engaged with the strip.

12. Apparatus according to claim 11 wherein the strip is fabricated of ferromagnetic material and the other end of the post member is magnetized to hold the post member normally in engagement with the strip.

13. Apparatus for measuring a linear dimension comprising a housing having first and second opposite parallel and straight spaced sides and a third substantially straight side intersecting the first and second sides and lying normal thereto and defining an enclosed chamber therein and a slot aperture from the chamber to the first side adjacent the third side, an elongated strip substantially inelastic in the direction of its elongate extent and resiliently flexible in the direction of its thickness, the strip passing through the slot aperture so that one end of the strip is disposed in the chamber and the other end is disposed exteriorly of the housing, the strip being adapted to coil upon itself in the housing when the other end thereof is moved toward the housing, the side of the strip opening away from the housing third side carrying a first scale calibrated in selected units of measurement and having its origin at the said other end of the strip, the first and second sides of the housing being spaced apart $n$ integral selected units of measurement, the side of the strip which carries the first scale also carrying a second scale calibrated in the selected units of measurement and having its origin at the said other end of the strip commencing with the value n, the other side of the strip carrying a third scale calibrated in the selected units of measurements and having its origin spaced a predetermined distance from the said other end of the strip, a window formed in the third side of the housing to expose the said other side of the strip, means in the housing for guiding the strip past the window, a magnifying lens mounted in the window and defining a third scale reference mark disposed parallel to and said predetermined distance from the housing first side, an elongated substantially planar post member having a width no greater than the width of the strip, the post member normally being straight but being resiliently flexible like the strip, hinge means hingably connecting one end of the post member to the other end of the strip for movement of the post member into and out of parallel alignment and engagement with the side of the strip opposite from the third side of the housing, the hinge means including stop means for limiting movement of the post member out of alignment with the strip to a position in which the post member is normal to the strip, the last-named means being disposed normal to the strip when the post member is aligned with the strip and extending away from said other side of the strip, a distance greater than the spacing of the slot aperture from the housing third side, the strip being fabricated of a ferromagnetic material, the other end of the post member being magnetized to hold the post member normally in engagement with the strip, the side of the post member which is opposite from the strip when the post member is aligned with the strip reproducing the portions of the first and second scales which are overlaid by the post member when the post member is aligned and engaged with the strip, a second straight post member disposed adjacent and parallel to one of the first and second sides, second post mounting means for mounting the post for movement toward and away from said one housing side, the second post mounting means being arranged to maintain the second post member parallel to said one housing side during said movement, and a fourth scale and scale referencing means therefor defined by the housing and the second post mounting means for indicating the distance between the second post member and said one side of the housing.

14. In a tape measure including a housing defining an enclosed chamber therein and having a straight exterior side and a slot aperture from the chamber to the exterior of the housing, an elongated strip substantially inelastic in the direction of its elongate extent and resiliently flexible in the direction of its thickness, the strip passing through the slot aperture so that one end of the strip is disposed in the chamber and the other end is disposed exteriorly of the housing, one side of the strip carrying a measuring scale having its origin at the other end of the strip, the strip adapted to be coiled on itself in the housing when the other end thereof is moved toward the housing, apparatus for accurately measuring the dimensions of small objects comprising an elongated straight post member disposed adjacent to and in parallel alignment with the straight side of the housing, post member mounting means for mounting the post member for movement toward and away from the housing side and comprising guide means including a pair of parallel guides defined by the housing extending normal to the housing straight side and a lateral extension from one end of the post member slidably engaged between the guides, a second measuring scale carried by the housing adjacent the guide means, and scale referencing means for the second measuring scale defined by the end of the extension opposite from the post member for indicating the distance between the housing side and the post member.

References Cited by the Examiner

UNITED STATES PATENTS

| | | | |
|---|---|---|---|
| 558,113 | 4/1896 | Rodick | 33—137 |
| 652,814 | 7/1900 | Setzer | 33—143 X |
| 1,066,972 | 7/1913 | Aitken | 33—137 |
| 1,287,040 | 12/1918 | Junker | 33—143 |
| 1,646,826 | 10/1927 | Langsner | 33—137 |
| 1,926,581 | 9/1933 | Clarke | 33—138 X |
| 2,574,272 | 11/1951 | McCully | 33—137 |
| 2,599,320 | 6/1952 | Dart | 33—138 X |
| 3,004,346 | 10/1961 | Quenot | 33—138 |
| 3,087,251 | 4/1963 | Betz | 33—138 |

FOREIGN PATENTS 842,847  5/1952  Germany.

LEONARD FORMAN, *Primary Examiner.*

ISAAC LISANN, *Examiner.*

B. A. DONAHUE, *Assistant Examiner.*